United States Patent [19]

Watanabe et al.

[11] Patent Number: 4,657,965
[45] Date of Patent: Apr. 14, 1987

[54] SILICONE ELASTOMER COMPOSITION

[75] Inventors: Junichiro Watanabe; Yuichi Funahashi, both of Ohta; Kazuo Sugiura, Matsuzaka; Hironori Matsumoto, Yokkaichi, all of Japan

[73] Assignees: Toshiba Silicone Co., Ltd.; Japan Synthetic Rubber Co., Ltd., both of Tokyo, Japan

[21] Appl. No.: 789,833

[22] Filed: Oct. 21, 1985

[30] Foreign Application Priority Data

Oct. 22, 1984 [JP] Japan .................... 59-221541
Oct. 22, 1984 [JP] Japan .................... 59-220357

[51] Int. Cl.$^4$ .................. C08L 83/04; C08L 83/00
[52] U.S. Cl. .................. 524/506; 524/588; 525/100; 525/104; 525/105; 525/106; 528/21; 528/23
[58] Field of Search .................. 524/588, 492, 506; 525/100, 104, 105, 106, 474; 528/21, 23

[56] References Cited

U.S. PATENT DOCUMENTS 2,842,520  7/1958  Polmanteer et al. ............. 260/46.5
4,376,184  3/1983  Itoh et al. ........................ 525/106

FOREIGN PATENT DOCUMENTS 1135865  12/1956  France .
 781279   8/1957  United Kingdom .

*Primary Examiner*—Lewis T. Jacobs
*Attorney, Agent, or Firm*—Finnegan, Henderson, Farabow, Garrett & Dunner

[57] ABSTRACT

A silicone elastomer composition which has novel crosslinking points comprises (A) 100 parts by weight of a polyorganosiloxane of a polymerization degree of at least 20, wherein the organic groups are selected from monovalent substituted and unsubstituted hydrocarbon groups and are attached to silicon atom, and at least two of the organic groups are monovalent hydrocarbon groups possessing at least five carbon astoms and a carbon-carbon double bond bonded to a silicon atom via at least one carbon atom, (B) 5 to 200 parts by weight of an inorganic filler having a specific surface area of at least 50 m$^2$/g, and (C) 0.1 to 25 parts by weight of a vulcanizer selected from the group consisting of sulfur, sulfur donor, substituted or unsubstituted alkylphenol resins, and quinoids.

13 Claims, No Drawings

SILICONE ELASTOMER COMPOSITION

The present application claims priority of Japanese patent application Ser. Nos. 84/220357 and 84/221541 filed on respective Oct. 22, 1984.

BACKGROUND OF THE INVENTION

This invention relates to a silicone elastomer composition possessing novel crosslinking points, and more particularly to a silicone elastomer composition possessing two or more organic groups included at least five carbon atoms and a carbon carbon double bond bonding to a silicon atom via at least one carbon atom as the crosslinking points thereof.

Conventional silicone elastomer compositions have vinyl groups as their crosslinking groups. A shaped article of silicone elastomer, therefore, can be obtained by blending a vinyl group-containing polyorganosiloxane as a base polymer with an organic peroxide as a vulcanizer and molding the obtained blend, or blending with a polyorganohydrogen siloxane and a platinum compound and molding the obtained blend.

Conventional organic synthetic rubber compositions are vulcanized with sulfur or a sulfur donor. Some of such organic synthetic rubber compositions (such as, for example, EPDM and butyl rubber) are vulcanized with a substituted or unsubstituted alkylphenol resin or with a quinoid.

The conventional silicone elastomer compositions which contain vinyl groups as their crosslinking-point groups, however, cannot be vulcanized by using any of the vulcanizers intended for the conventional organic synthetic rubber compositions.

Therefore, it has been considered that the obtaining of elastomers having outstanding physical properties is quite hard even if these silicone elastomer is mixed with and vulcanized together with natural rubber or organic synthetic rubber.

On the other hand, when an addition reaction type silicone elsastomer is mixed with natural rubber or organic synthetic rubber, a platinum compound used for crosslinking of the silicone elastomer is poisoned and deactivated by such compounds incorporated in the organic synthetic rubber as, for example, sulfur compounds, amino type compounds, phosphor compounds, as well as a small amount of metal compounds such as Pb, Sn, Zn, Bi and Co. Thus, this process has a disadvantage and is poor in actual usage.

OBJECTS AND SUMMARY OF THE INVENTION

The present inventors conducted a diligent study in search of a silicone elastomer composition capable of being vulcanized with any of the vulcanizers such as sulfur, sulfur donors, substituted or unsubstituted alkylphenol resins and quinoids intended for conventional organic synthetic rubber, therefore, incapable of being poisoned or deactivated by a very small amount of components as the above platinum compound is.

They have consequently found a silicone elastomer composition possessing novel crosslinking point and accomplished this invention as a result.

The first object of the invention, therefore, is to provide a silicone elastomer composition capable of being vulcanized with sulfur, a sulfur donor, a substituted or unsubstituted alkylphenol resin, or quinoid which is usable effectively for any conventional organic synthetic rubber.

The second object of this invention is to provide a silicone elastomer composition incapable of being poisoned and inactivated by any minute extraneous component such as a platinum compound.

The third object of this invention is to provide a silicone elastomer composition capable of being co-vulcanized with an organic rubber.

The other objects of the present invention will become apparent from the following description.

DETAILED DESCRIPTION OF THE INVENTION

The polyorganosiloxane which constitutes the basis for this invention is a substantially linear polyorganosiloxane represented by the general formula:

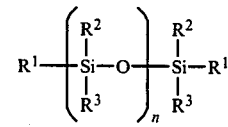

It may contain some $R^1SiO_{3/2}$ units or $SiO_2$ units in the structure thereof. In the formula, $R^2$ and $R^3$ stand for the same or different monovalent organic groups to be selected from substituted and unsubstituted monovalent hydrocarbon groups. $R^1$ stands for an organic group selected from the same monovalent hydrocarbon groups as that for $R^2$ and $R^3$ and the $R^1$s may be partly or wholly hydroxyl groups or alkoxy groups.

Specific examples of the monovalent hydrocarbon groups include alkyl groups such as methyl, ethyl, propyl, butyl, pentyl, hexyl, octyl, and decyl groups, alkenyl groups such as vinyl and allyl groups, aryl groups such as phenyl and tolyl groups; aralkyl groups such as β-phenylethyl and β-phenylpropyl groups, and substituted hydrocarbon groups such as chloromethyl, cyanoethyl, trifluoropropyl, and chlorophenyl groups.

To fulfil the object of this invention, the polyorganosiloxane (A) in the silicone elastomer composition is required to contain in the structure thereof at least two hydrocarbon groups possessing at least five carbon atoms and a carbon-carbon double bond bonded to a silicon atom via at least one carbon atom. Specific examples of such hydrocarbon groups include ethylidene norbornyl, methylene norbornyl, dicyclopentenyl, 4-pentenyl, 4-hexenyl, and cyclooctenyl groups. Such hydrocarbon groups can be of just one species or two or more species. From the standpoint of availability of raw material and reactivity of double bond, alkylidene norbornyl groups prove to be particularly desirable.

So long as the amount of such groups possessing a double bond falls within the aforementioned range, the polyorganosiloxane may contain such other aliphatic unsaturated groups such as vinyl groups in a small proportion.

The incorporation into the polyorganosiloxane of the hydrocarbon group a double bond characteristic of the present invention is attained, for example, by adding a non-conjugated diene such as 5-ethylidene-2-norbornene, 5-methylene-2-norbornene, dicyclopentadiene, 1, 5-cyclooctadiene, 1, 4-pentadiene, or 1, 4-hexadiene to a polyorganosiloxane possessing hydrogen atom bonded to a silicon atom in the presence of a catalytic amount of a platinum compound such as chloroplatinic acid. If a norbornene ring-containing compound is used for the addition to the polyorganosiloxane, the double bond in the norbornene ring undergoes hydrosilylation. If 1,4-hexadiene is used for the same purpose, the double bond at the terminal undergoes hydrosilylation.

The polyorganosiloxane containing the hydrocarbon group possessing a double bond obtained as described above can be converted into a macromolecular compound by the conventional method. For example, a polysiloxane having a polymerization degree of not less than 3,000 and containing an ethylidene norbornyl group can be obtained by thermally polymerizing prescribed amounts of octamethylcyclotetrasiloxane, hexamethyldi(ethylidene norbornyl)cyclotetrasiloxane, and decamethyltetrasiloxane in the presence of potassium hydroxide as a catalyst and subsequently neutralizing the resultant polymerization product with phosphoric acid.

If the polyorganosiloxane has, in the molecular unit thereof, zero or one hydrocarbon group possessing at least five carbon atoms and having a carbon carbon double bond bonded to a silicon atom via at least one carbon atom, it is not capable of being vulcanized with the vulcanizer used by this invention.

The polyorganosiloxane is required to contain at least two such hydrocarbon groups per molecule. The number of these hydrocarbon groups in the molecular unit has no upper limit in particular. For the resultant silicone elastomer to acquire satisfactory properties, these hydrocarbon groups should be present in a concentration of 0.05 to 10 mol % based on all the organic groups bonded to silicon atoms in the molecule. If the concentration is less than 0.05 mol %, the tea strength is not sufficient. If the concentration exceeds 10 mol %, the tensile strength is not sufficient.

The positions at which these groups are attached are not specifically limited. The groups may be bonded to silicon atoms either in the internal part or at the terminal units of the molecular chain.

The number of organic groups bonded to silicon atoms of polyorganosiloxane (A) is in the range of 1.9 to 2.1, preferably 1.98 to 2.02 per silicon atom, on average. If the number of organic groups is less than 1.9, the resultant silicone elastomer composition fails to constitute a satisfactory elastomer. If the number exceeds 2.1, the polyorganosiloxane cannot be obtained with a polymerization degree exceeding 20.

For the resultant silicone elastomer composition to impart satisfactory mechanical properties, the polymerization degree (n +1) of polyorganosiloxane (A) is required to exceed 20, preferably 100, and more preferably 1,000. In consideration of the ease of kneading the components in preparation of a homogeneous composition, the polymerization degree is preferably in the range of 2,000 to 20,000.

Specific examples of the organic rubber usable effectively in this invention are diene type rubber such as natural rubber, isoprene rubber, styrene butadiene rubber, butadiene rubber, acrylonitrile butadiene rubber, and chloroprene rubber, ethylene α-olefine type rubbers such as ethylene propylene rubber and ethylene propylene diene rubber, butyl rubber, halogenated butyl rubber, fluoro rubber, acryl rubber, epichlorohydrin rubber, ethylene vinyl acetate copolymer, and ethylene acrylate rubber. In the organic rubber cited above, ethylene propylene rubber, ethylene propylene diene rubber, butyl rubber, halogenated butyl rubber, and acryl rubber prove particularly desirable.

When the polyorganosiloxane and an organic rubber are jointly used, they are desired to be combined at a mixing ratio falling in the range of 95/5 to 5/95 (by weight).

The present invention permits additional use of a polyorganosiloxane which contains substantially no monovalent hydrocarbon group possessing at least five carbon atoms and a carbon-carbon double bond bonded to a silicon atom via at least one carbon atom but contains other crosslinking group such as, for example, vinyl group, mercapto group, or (meth) acryloyl group. The polyorganosiloxane of the foregoing description may be additionally incorporate in an amount of not more than 95% , preferably not more than 50%, by weight based on the total polyorganosiloxane(When the polyorganosiloxane and an organic rubber are jointly used, it is based on the total of polyorganosiloxane and an organic rubber.).

The inorganic filler used in this invention is intended as a component for imparting various properties, particularly mechanical strength, to molded articles of silicone elastomer obtained from the composition of the present invention. For the mechanical strength so imparted to be sufficient, the specific surface area of the inorganic filler is required to exceed 50 $m^2/g$ and desirably falls in the range of 100 to 300 $m^2/g$.

Examples of inorganic fillers answering the foregoing description are reinforcing silica such as fumed silica and precipitated silica, and various types of carbon black such as furnace black, channel black, thermal black, and acetylene black which are usable for particular purposes. The inorganic filler can be used in its unmodified form or it may be given a surface treatment as with an organic silicon compound, an organic resin acid, or an organic resin acid salt before it is put to use.

The amount of the inorganic filler used in the composition is in the range of 5 to 200 parts by weight per 100 parts by weight of polyorganosiloxane or the mixture of polyorganosiloxane with a organic rubber. When the composition contains no organic rubber and the amount of the inorganic filler is less than 5 parts by weight, no sufficient reinforcing effect is obtained. In corporation of the inorganic filler in any amount exceeding the aforementioned upper limit, 200 parts by weight, is difficult from the standpoint of workability when the polyorganosiloxane is used alone or when it is used jointly with the organic rubber.

The composition of this invention may further incorporate therein other inorganic filler such as, for example, ground quartz, diatomaceous earth, titanium dioxide, aluminum oxide, zinc oxide, magnesium oxide, magnesium carbonate, calcium carbonate, magnesium silicate, aluminum sulfate, calcium sulfate, barium sulfate, mica, asbestos, or glass powder besides the aforementioned reinforcing silica.

Optionally, the filler may be treated as with an organic silicon compound or polydiorganosiloxane to have the surface thereof rendered hydrophobic.

The vulcanizer used in this invention is intended as a component for effecting vulcanization of the polyorganosiloxane or of the combination of the polyorganosiloxane with the organic rubber and it is selected from the group consisting of sulfur, sulfur donors, substituted or unsubstituted alkylphenol resins, and quinoids.

Specific examples of the vulcanizer include sulfur donors such as tetramethyl thiuram disulfide, dipentamethylene thiuram tetrasulfide, and dithiodimorpholine, substituted or unsubstituted alkylphenol resins such as alkylphenol formaldehyde resin and bromoalkylphenol formaldehyde resin, and quinoids such as p-quinone dioxime and p,p'-dibenzoylquinone dioxime. One vulcanizer or a mixture of two or more vulcanizers selected from the group mentioned above may be used. Optionally, the composition may additionally incorporate therein a peroxide vulcanizer such as dicumyl peroxide.

The amount of the vulcanizer incorporated in the composiiton is selected in the range of 0.1 to 25 parts by weight based on 100 parts by weight of the polyorganosiloxane or the mixture of the polyorganosiloxane and the organic rubber. If the amount of the vulcanizer is less than 0.1 part by weight, vulcanization is not sufficiently effected. If the amount exceeds 25 parts by weight, the excess of the added vulcanizer produces no special effect and does harm t the physical properties of the vulcanized article of silicone elastomer or silicone-organic rubber co-vulcanizate.

The composition may further incorporate therein a heat-resistance improver, a flame retardant, a vulcanization accelerator, a processing aid, and a coloring matter, etc., known to the art.

The silicone elastomer composition of this invention can be easily obtained by blending the aforementioned components with a mixing machine for example, an internal mixer such as a Banbury mixer, kneader, intermixer, or roll mill generally adopted in the production of elastomer. The elastomer composition so obtained is molded and vulcanized into a finished product by the conventional method such as compression molding or extrusion molding.

EXAMPLES

The present invention will now be described more specifically with reference t working examples. Wherever "parts" are mentioned in the examples, they are "parts" by weight.

EXAMPLES 1-8

A mixture consisting of 296 parts of octamethyl cyclotetrasiloxane, 16.8 parts of heptamethyl ethylidene norbornyl cyclotetrasiloxane, and 0.18 part of decamethyltetrasiloxane was heated at 140° to 150° C., polymerized by addition of 0.007 part of potassium hydroxide for 15 hours at the same temperature, and then neutralized by addition of 0.004 part of phosphoric acid. The product thus obtained was a polyorganosiloxane containing 1 mol % of methylethylidene norbornyl siloxy units and having a polymerization degree of 7,000. With a two-roll mill, 100 parts of the polyorganosiloxane, 2.0 parts of polymethylsiloxane terminated by hydroxyl groups and a viscosity of 50 cSt, 50 parts of fumed silica having the surface treated with diorganodichlorosilane and having a specific surface area of 110 $m^2/g$ (produced by Degussa Co. and sold under the trademark "Aerosil R972"), and 5.0 parts of zinc oxide were thoroughly kneaded. The resultant blend was mixed with varying vulcanizer and vulcanization accelerator added in varying amonts indicated in Table 1. Consequently, there were obtained silicone elastomer composition samples, No. 1–No. 4 (Examples 1-4). Separately, the same blend was prepared with a two-roll mill as mentioned above, except that 50 parts of acetylene black having a specific surface area of 70 $m^2/g$ (produced by Denki Kagaku Kogyo Co., Ltd. and sold under the trademark "Denka Black") was used per 100 parts of the aforementioned polyorganosiloxane in the place of the aforementioned fumed silica. The blend was mixed with a varying vulcanizer added in a varying amount as indicated in Table 1. Consequently, there were obtained silicone elastomer composition samples, No. 5–No. 8 (Examples 5-8). These samples were subjected to press vulcanization under a pressure of 150 $kgf/cm^2$ for 20 minutes at varying press temperatures indicated in Table 1 to obtain elastomer sheets 2mm in thickness. These elastomer sheets were subjected to post-vulcanization at 200° C. for two hours and then tested for hardness, tensile strength, elongation, and tear strength in accordance with the procedures specified by JIS C 2123. The results are shown in Table 1.

COMPARATIVE EXPERIMENTS 1-8

For comparison, Comparative samples, No. 1–No. 8 (Comparative Experiments 1-8) were prepared, which consists of the same as silicone elastomer compositions Examples 1-8 except using a polyorganosiloxane containing 1.0 mol % of methylvinylsiloxane units and having a polymerization degree of 7,000 prepared by heating a mixture consisting of 296 parts of octamethylcyclotetrasiloxane, 3.5 parts of tetramethyltetravinylcyclotetrasiloxane, and 0.18 parts of decamethyltetrasiloxane at 140° to 150° C., polymerizing by addition of 0.007 part of potassium hydroxide for 15 hours at the same temperature, and subsequently neutralizing by addition of 0.004 part of phosphoric acid, in the place of the aforementioned ethylidene norbornyl group-containing polyorganosiloxane. These comparative samples were similarly tested. The results are shown in Table 1. The Comparative samples, No. 1–No. 4, used 50 parts of fumed silica (Aerosil R-972) and the Comparative samples, No. 5–No. 8, used 50 parts of acetylene black (Denka Black).

TABLE 1

| Sample No. | Example 1-8 ||||||||  Comparative Experiment 1-8 ||||||||
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Inoganic filler | Aerosil R972 *1a |||| Denka black *1b |||| Aerosil R972 *1a |||| Denka black *1b ||||
| Amount of vulcanizer and promotor | | | | | | | | | | | | | | | | |
| Sulfer | 1.5 | — | — | — | 1.5 | — | — | — | 1.5 | — | — | — | 1.5 | — | — | — |
| Sanceler TS *2 | 1.5 | — | — | — | 1.5 | — | — | — | 1.5 | — | — | — | 1.5 | — | — | — |
| Sanceler M *3 | 0.5 | — | — | — | 0.5 | — | — | — | 0.5 | — | — | — | 0.5 | — | — | — |
| Nocceler TRA *4 | — | 3.0 | — | — | — | 3.0 | — | — | — | 3.0 | — | — | — | 3.0 | — | — |
| Nocceler CZ *5 | — | 1.0 | — | — | — | 1.0 | — | — | — | 1.0 | — | — | — | 1.0 | — | — |
| Tackirol 201 *6 | — | — | 5.0 | — | — | — | 5.0 | — | — | — | 5.0 | — | — | — | 5.0 | — |
| Tackirol 250-I *7 | — | — | 5.0 | — | — | — | 5.0 | — | — | — | 5.0 | — | — | — | 5.0 | — |
| Vulnoc c,m *8 | — | — | — | 2.0 | — | — | — | 2.0 | — | — | — | 2.0 | — | — | — | 2.0 |
| Red lead *9 | — | — | — | 10.0 | — | — | — | 10.0 | — | — | — | 10.0 | — | — | — | 10.0 |
| Press vulcanization Temperature °C. | 170 | 180 | 190 | 170 | 170 | 180 | 190 | 170 | 170 | 180 | 190 | 170 | 170 | 180 | 190 | 170 |

TABLE 1-continued

| Sample No. | Example 1-8 | | | | | | | | Comparative Experiment 1-8 | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Inoganic filler | Aerosil R972 *1a | | | | Denka black *1b | | | | Aerosil R972 *1a | | | | Denka black *1b | | | |
| Physical properties | | | | | | | | | | | | | | | | |
| Hardness (JIS A) | 63 | 63 | 67 | 61 | 61 | 64 | 64 | 62 | 48 | 39 | *10 | *10 | *10 | *10 | *10 | *10 |
| Tensile strength kgf/cm$^2$ | 81 | 79 | 71 | 73 | 63 | 59 | 56 | 59 | 29 | 21 | — | — | — | — | — | — |
| Elongation % | 400 | 380 | 210 | 300 | 220 | 180 | 180 | 200 | 220 | 150 | — | — | — | — | — | — |
| Tear strength kgf/cm | 20 | 19 | 16 | 18 | 14 | 12 | 13 | 12 | 7 | 6 | — | — | — | — | — | — |

*1a Fumed silica (Degussa Co.)
*1b Acetylene black (Denki Kagaku Kogyo Co.)
*2 Tetramethyl thiuram monosulfide (Sanshin Kagaku Co.)
*3 Mercaptobenzothiazole (Sanshin Kagaku Co.)
*4 Dipentamethylene thiuramtetrasulfide (Ohouchi Shinko Kagaku Co.)
*5 N-Cyclohexyl-2-benzothiazyl sulfenamide (Ohouchi Shinko Kagaku Co.)
*6 Alkylphenol formaldehyde resin (Sumitomo Chemical Co., Ltd.)
*7 Bromomethylalkylphenol formaldehyde resin (Sumitomo Chemical Co., Ltd.)
*8 p-Benzoquinondioxime (Ohouchi Shinko Kagaku Co.)
*9 Red lead (Nippon Kagaku Co.)
*10 Vulcanization too poor to permit production of elastomeric molded

EXAMPLE 9

A mixture consisting of 296 parts of octamethylcyclotetrasiloxane, 32.4 parts of hexamethyldi(ethylidene norbornyl)cyclotetrasiloxane, and 0.22 part of decamethyltetrasiloxane was heated at 140° to 150° C., polymerized by addition of 0.009 part of potassium hydroxide, for 15 hours at the same temperature, and then neutralized by addition of 0.005 part of phopshoric acid. The product thus obtained was polyorganosiloxane containing 3 mol % of methyl (ethylidene norbornyl)siloxy units and having a polymerization degree of 6,000.

With a two-roll mill, 100 parts of the polyorganosiloxane was thoroughly blended with 3 parts of polydimethylsiloxane terminated by hydroxyl groups and a viscosity of 50 cSt, 30 parts of precipitated silica having a specific surface area of 240 m$^2$/g (produced by Japan Silica Co. and sold under the trademark "Nipsil VN"), 25 parts of furnace black having a specific surface area of 100 m$^2$/g (produced by AA Chemical Co. and sold under the trademark "Shoblack 0"), 5 parts of zinc oxide, and 1 part of stearic acid. The resultant blend was mixed with 3 parts of dipentamethylene thiuram tetrasulfide as a vulcanizer (produced by Ouchi Shinko Kagaku and sold under the trademark "Nocceler TRA") and 1.0 part of N-cyclohexyl-2-benzothiazoyl sulfenamide (produced by Ouchi Shinko Kagaku and sold under the trademark "Nocceler CZ") to obtain a silicone elastomer composition sample No. 9.

This sample was subjected to press vulcanization press under a pressure of 150 kgf/cm$^2$ for 20 minutes at a press temperature of 170° C., to afford a sheet of elastomer 2 mm in thickness. This sheet was subjected to post-vulcanization at 200° C. for two hours and then tested for hardness, tensile strength, elongation, and tear strength by the procedures specified by JIS C 2123. The results are shown in Table 2.

EXAMPLE 10

A mixtures consisting of 296 parts of octamethylcyclotetrasiloxane, 8.3 parts of heptamethyl(ethylidene norbornyl)cyclotetrasiloxane, 8.2 parts of octaphenylcyclotetrasiloxane, and 0.26 part of decamethyltetrasiloxane was heated to 140° to 150° C., polymerized by additio of 0.009 part of potasium hydroxide for 20 hours at the same temperature, and then neutralized by addition of 0.005 part of phosphoric acid. The product thus obtained was a polyorganosiloxane containing 0.5 mol % of (methylethylidene norbornyl)siloxy units and 1 mol % of diphenylsiloxy units and having a polymerization degree of 5,000.

With a two-roll mill,100 parts of this polyorganosiloxane was throughly mixed with 4 parts of polyorganosiloxane terminated by methoxy groups and containing dimethylsiloxy units and diphenylsiloxy units at a molar ratio of 2:1 (having a viscosity of 50 cSt), 45 parts of fumed silica having a specific surface area of 200 m$^2$/g (produced by Japan Aerosil Co. and sold under the trademark "Aerosil 200"), and 100 parts of zinc oxide. The resultant mixture was further mixed with 5.0 parts of bromomethylalkylphenol formaldehyde resin as a vulcanizer (produced by Sumitomo Chemical Co., Ltd. and sold under the trademark "Tackirol 250-I") and 5.0 parts of alkylphenol formaldehyde resin (produced by Sumitomo Chemical Co., Ltd. and sold under the trademark "Tackirol 201") to afford a silicone elastomer composition sample, No. 10.

This sample was subjected to press vulcanization under a pressure of 150 kgf/cm$^2$ for 20 minutes at a press temperature of 190° C., to produce a sheet of elastomer 2 mm in thickness. This sheet of elastomer was subjected to post-vulcanization at 200° C. for two hours and then tested for hardness, tensile strength, elongation, and tear strength by the procedures specified by JIS C 2123. The results are shown in Table 2.

EXAMPLE 11

A mixture consisting of 296 parts of octamethylcyclotetrasiloxane, 26.4 parts of heptamethyldicyclopentenylcyclotetrasiloxane, and 0.13 part of decamethyltetrasiloxane was heated to 140° to 150.C., polymerized by addition of 0.007 part of potassium hydroxide for 15 hours at the same temperature, and then neutralized by addition of 0.004 part of phosphoric acid. The product thus obtained was a polyorganosiloxane containing 1.5 mol % of methyldicyclopentenylsiloxy units and having a polymerization degree of 10,000.

With a two-roll mill, 100 parts of this polyorganosiloxane was thoroughly mixed with 5 parts of polydimethylsiloxane terminated by hydroxyl groups and a viscosity of 50 cSt, 15 parts of precipitated silica having a specific surface area of 240 m$^2$/g (produced by Japan Silica Co. and sold under the trademark "Nipsil VN"), 35 parts of acetylene black having a specific surface area of 70 m$^2$/g (produced by Denki Kagaku Kogyo Co., Ltd. and sold under trademark "Denka Black"), 5 parts of zinc oxide, and 1 part of stearic acid. The resultant mixture was further mixed with 1.0 part of sulfur as a vulcanizer, 0.5 part of N-cyclohexyl-2-benzothiazyl sulfenamide as a vulcanization accelerator (produced by Ouchi Shinko Kagaku Co. and sold under the trademark "Nocceler CZ"), and 1.0 part of tetramethyl thiuram disulfide (produced by Sanshin Kagaku Co. and sold under the trademark "Sanceler TT") to produce a silicone elastomer composition sample, No. 11.

This sample was subjected to post-vulcanization at 200° C. for two hours and then tested for hardness, tensile strength, elongation, and tear strength by the procedures specified by JIS C 2123. The results are shown in Table 2.

EXAMPLE 12

A mixture consisting of 296 parts of octamethylcyclotetrasiloxane, 15.2 parts of heptamethyl(4-hexenyl)cyclotetrasiloxane, 0.72 part of tetramethyltetravinylcyclotetrasiloxane, and 0.26 part of decamethyltetrasiloxane was heated to 140° to 150° C., polymerized by addition of 0.007 part of potassium hydroxide, for 15 hours at the same temperature, and then neutralized by addition of 0.004 part of phosphoric acid. The product so obtained was a polyorganosilxane containing 1 mol % of methyl(4-hexenyl)siloxy units and 0.2 mol % of methylvinylsiloxy units and having a polymerization degree of 5,000.

With a two-roll mill, 100 parts of this polyorganosiloxane was thoroughly mixed with 40 parts of fumed silica having a specific surface area of 200 m2/g (produced by Japan Aerosil Co. and sold under the trademark "Aerosil 200") and 5 parts of zinc oxide.

The resultant mixture was further mixed with 0.5 part of sulfur as a vulcanizer and 2.0 parts of N-cyclohexyl-2-benzothiazyl sulfenamide (produced by Ouchi Shinko Kagaku Co. and sold under the trademark "Nocceler CZ"), 1.0 part of tetramethylthiuram disulfide (produced by Sanshin Kagaku Co. and sold under the trademark "Sanceler TT"), and 1.0 part of dipentamethylene thiuram tetrasulfide (produced by Ouchi Shinko Kagaku Co. and sold under the trademark "Nocceler TRA") as vulcanization accelerators to produce a silicone elastomer composition sample, No. 12. This sample was subjected to press vulcanization under a pressure of 150 kgf/cm² for 20 minutes at a press temperature of 170° C. to obtain a elastomer sheet 2 mm in thickness. This sheet was subjected to post-vulcanization at 200° C. for two hours and then tested for hardness, tensile strength, elongation, and tear strength by the procedures specified by JIS C 2123. The results are shown in Table 2.

TABLE 2

| Sample No. | 9 | 10 | 11 | 12 |
|---|---|---|---|---|
| Hardness (JIS A) | 51 | 59 | 53 | 57 |
| Tensile strength kgf/cm² | 57 | 83 | 55 | 62 |
| Elongation % | 190 | 420 | 160 | 230 |
| Tear strength kgf/cm | 17 | 21 | 15 | 18 |

EXAMPLE 13 AND COMPARATIVE EXPERIMENT 9

A flask provided with a dropping funnel was charged with 592 parts of octamethylcyclotetrasiloxane, 20.7 parts of hexamethyldi(ethylidene norbornyl)cyclotetrasiloxane, and 0.38 part of decamethyltetrasiloxane. The reactants in the flask were heated to 150° C. The hot reaction mixture conseqently formed and 0.01 part of potassium hydroxide added as a catalyst thereto were stirred for polymerization at 150° C. for 15 hours. Then, polymerization mixture was neutralized by addition of 0.006 part of phosphoric acid and then distilled to remove the unreacted reactants. Consequently, there was obtained 560 parts of polyorganosiloxane gum of the following formula having a molecular weight of 530,000 and containing 0.5 mol % of ethylidene norbonyl group in the organic groups thereof. Separately, a polyorganosiloxane having the ethylidene norbornyl content indicatede in Table 3 was obtained by varying the amounts of component siloxanes used in the charge.

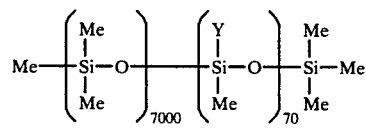

(wherein Me stands for methyl group and Y stands for the mixture of

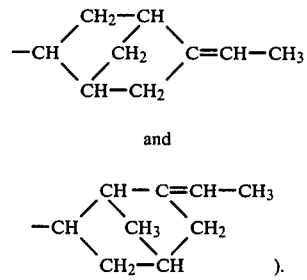

).

In a Banbury mixer, the polymethyl(ethylidene norbornyl)siloxane obtained as described above and having an ethylidene norbornyl group content (abbreviated occasionally hereinafter as "ENB content") of 0.5 mol % in the organic groups and the remainder is methyl group and having trimethylsiloxy units as terminals thereof was uniformly blended in combination with butyl rubber. With a two-roll, the resultant mixture and a sulfur vulcanizer added thereto were blended to prepare a compound. Then, the compound was vulcanized for 60 minuts under pressure of 150 kgf/m² at a temperature of 150° C., to afford a vulcanized sheet 2 mm in thickness. The sheet was tested for physical properties by the method of JIS K 6301. The results are shown in Table 3.

For comparison, a polymethylvinylsiloxane having a vinyl group content of 0.5 mol % in the organic groups and the remainder is methyl group and having trimethylsiloxy units as terminals and butyl rubber added thereto were blended and vulcanized and tested for physical properties by following the procedure of Example 13.

It is noted from Table 3 that the polymethyl (ethylidene norbornyl)siloxane excels the conventional polymethylvinylsiloxane in crosslinking property and, consequently, in mechanical strength and in resistance to heat and resistance to hot water.

TABLE 3

| Sample No. | Example 13 | Comparative Experiments 9 |
|---|---|---|
| Amount | | |
| Polymethyl(ethylidene norbornyl) siloxane (containing 0.5 mol % of ENB having a polymerization degree of 7000) | 50 | — |
| Polymethylvinylsiloxane (containing 0.5 mol % of vinyl group, having a polymerization degree of 7000) | — | 50 |
| JSR Butyl 268 *1 | 50 | 50 |
| Aerosil 972 *2 | 25 | 25 |
| Shoblack 0 *3 | 3 | 3 |
| Zinc oxide | 0 | 0 |
| Stearic acid | 1 | 1 |
| Sancellar TT *4 | 1 | 1 |
| Sulfur | 1.75 | 1.75 |
| Physical properties | | |
| Initial properties | | |
| Tensile strength kgf/cm$^2$ | 105 | 32 |
| Elongation % | 540 | 230 |
| Hardness (JIS A) | 56 | 52 |
| Heat resistance (Heating 175° C. × 96 h in the gear oven) | | |
| Rate of change tensile strength % | −10 | −79 |
| Rate of change elongation % | −17 | −63 |
| Hardness change | +3 | +4 |
| Hot water resistance (Heating 175° C. × 48 h in water (in autoclave)) | | |
| Rate of change tensile strength % | −15 | −95 |
| Rate of change elongation % | +2 | +4 |
| Hardness change | −5 | −19 |

*1 Butyl rubber (Japan Synthetic Rubber Co.)
*2 Silica (Japan Aerosil Co.)
*3 Carbon black (A.A. Chemical Co.)
*4 Tetramehyl thiuram disulfide (Sanshin Kagaku CO.)

EXAMPLES 14–18

Polymethyl(ethylidene norbornyl)siloxanes having different ethylidene norbornyl group contents of 0.1, 0.3, 0.5, 1.0, 2.0, and 4.0 mol % and the remainder is methyl group and having trimethylsidloxy units as terminals as indicated in Table 4 and butyl rubber added thereto were treated and tested for physical properties by following the procedure of Example 1. The results are shown in Table 4.

TABLE 4

| Sample No. | 14 | 15 | 16 | 17 | 18 |
|---|---|---|---|---|---|
| Amount | | | | | |
| Polymethyl(ethylidene norbornyl)siloxane (containing 0.1 mol % of ENB having a polymerization degree of 6000) | 50 | — | — | — | — |
| Polymethyl(ethylidene norbornyl)siloxane (containing 0.3 mol % of ENB having a polymerization degree of 6000) | — | 50 | — | — | — |
| Polymethyl(ethylidene norbornyl)siloxane (containing 1.0 mol % of ENB having a polymerization degree of 6000) | — | — | 50 | — | — |
| Polymethyl(ethylidene norbornyl)siloxane (containing 2.0 mol % of ENB having a polymerization degree of 6000) | — | — | — | 50 | — |
| Polymethyl(ethylidene norbornyl)siloxane (containing 4.0 mol % of ENB having a polymerization degree of 6000) | — | — | — | — | 50 |
| JSR Butyl 268 | 50 | 50 | 50 | 50 | 50 |
| Silica | 25 | 25 | 25 | 25 | 25 |
| Carbon black | 25 | 25 | 25 | 25 | 25 |
| Zinc oxide | 3 | 3 | 3 | 3 | 3 |
| Stearic acid | 1 | 1 | 1 | 1 | 1 |
| Tetraethyl thiuram disulfide | 1.71 | 1.71 | 1.71 | 1.71 | 1.71 |
| Sulfur | 1.75 | 1.75 | 1.75 | 1.75 | 1.75 |
| Physical properties | | | | | |
| Initial properties | | | | | |
| Tensile strength kgf/cm$^2$ | 105 | 107 | 106 | 106 | 104 |
| Elongation % | 610 | 590 | 480 | 370 | 320 |
| Hardness(JIS A) | 50 | 53 | 60 | 65 | 68 |

EXAMPLES 19 AND 20 AND COMPARATIVE EXPERIMENTS 10 AND 11

Polymethyl(ethylidene norbornyl)siloxanes having different compositions as indicated in Table 5 and a fixed ENB content of 0.5 mol % were blended with butyl rubber. The resultant mixtures were treated by following the procedure of Exsample 13 and the resultant compounds were similarly tested for physical properties. The compounds were trially extruded with a 50 mm extruder (L/D=12). The results are shown in Table 5. It is noted from Table 5 that the composition having butyl contents less than 5% were deficient in mechanical strength and the compounds having polyorganosiloxane contents less than 5% were deficient in heat resisting property, metal die release property, and extrusion molding property.

TABLE 5

| Sample No. | Examples 19 | 13 | Comparative Experiments 20 | 10 | 11 |
|---|---|---|---|---|---|
| Amount | | | | | |
| Polymethyl(ethylidene norbornyl)siloxane (containing 0.5 mol % of ENB having a polymerization degree of 7000) | 20 | 50 | 80 | 3 | 97 |
| Butyl rubber | 80 | 50 | 20 | 97 | 3 |
| Silica | 25 | 25 | 25 | 25 | 25 |
| Carbon black | 25 | 25 | 25 | 25 | 25 |
| Zinc oxide | 3 | 3 | 3 | 3 | 3 |
| Stearic acid | 1 | 1 | 1 | 1 | 1 |
| Tetraethyl thiuram disulfide | 1 | 1 | 1 | 1 | 1 |
| Sulfur | 1.75 | 1.75 | 1.75 | 1.75 | 1.75 |
| Physical properties | | | | | |
| Initial properties | | | | | |
| Tensile strength kgf/cm$^2$ | 138 | 105 | 80 | 161 | 77 |
| Elongation % | 550 | 540 | 490 | 560 | 430 |
| Hardness(JIS A) | 57 | 56 | 57 | 61 | 58 |
| Heat resistance (175° C. × 96 h) | | | | | |
| Rate of change tensile strength % | −13 | −10 | −9 | −99 | −4 |
| Rate of change elongation % | −18 | −17 | −15 | −83 | −12 |
| Hardness change | −4 | +3 | +2 | −201 | +21 |
| Processability | | | | | |

EXAMPLES 21-22 AND COMPARATIVE EXPERIMENTS 12-13

In a Banbury mixer, the polymethyl(ethylidene norbornyl)siloxane having an ENB content of 0.5 mol % consisting of the components shown in Table 6, butyl rubber and halogenated butyl rubber were uniformly blended. With a two-roll mill, the resultant mixture and a resin vulcanizer added thereto were blended to prepare a compound. Then, the compound was vulcanized for 30 minuts under pressure of 150 kgf/cm$^2$ at a temperature of 190° C., to afford a vulcanized sheet 2 mm in thickness. The sheet was tested for physical properties by the method of JIS K 6301. The results are shown in Table 6.

For comparison, a polymethylvinylsiloxane having a vinyl group content of 0.5 mol %, butyl rubber and halogenated butyl rubber were blended and vulcanized by the same procedure. The samples obtained for Comparative Experiments 12 and 13 were tested for physical properties.

It is noted from Table 6 that when the vulcanization was carried out using a resin vulcanizer, the polymethyl(ethylidene norbornyl)siloxane is superior to the conventional vinyl silicone rubber(polymethylvinylsiloxane) in co-vulcanizing property and, consequently, in mechanical strength and in resistance to heat and hot water.

TABLE 5-continued

| Sample No. | Examples | | | Comparative Experiments | |
|---|---|---|---|---|---|
| | 19 | 13 | 20 | 10 | 11 |
| Mold release properties | good | good | good | x | good |
| Extrusion processability | good | good | good | x | good |

TABLE 6

| | Examples | | Comparative Experiments | |
|---|---|---|---|---|
| Sample No. | 21 | 22 | 12 | 13 |
| Amount | | | | |
| Polymethyl(ethylidene norbornyl)siloxane (containing 0.5 mol % of ENB having a polymerization degree of about 7000) | 50 | 50 | — | — |
| Polymethylvinylsiloxane (containing 0.5 mol % of vinyl group) | — | — | 50 | — |
| Butyl rubber | 50 | — | 50 | — |
| JSR butyl 1066 *1 | — | 50 | — | 50 |
| Neoprene W *2 | 2.5 | — | 2.5 | — |
| Silica | 25 | 25 | 25 | 25 |
| Carbon black | 25 | 25 | 25 | 25 |
| Zinc oxide | 2.5 | 2.5 | 2.5 | 2.5 |
| Tackirol 201 *3 | 5 | 5 | 5 | 5 |
| Tackirol 250-I *4 | 5 | 5 | 5 | 5 |
| Physical properties | | | | |
| Initial properties | | | | |
| Tensile strength kgf/cm$^2$ | 100 | 99 | 31 | 29 |
| Elongation % | 380 | 360 | 210 | 190 |
| Hardness (JIS A) | 58 | 52 | 52 | 50 |
| Heat resistance (175° C. × 96 h) | | | | |
| Rate of change tensile strength % | −8 | −10 | −37 | −41 |
| Rate of change elongation % | −19 | −20 | −74 | −80 |
| Hardness change | +14 | +15 | +21 | +25 |
| Hot water resistance (175° C. × 48 h) | | | | |
| Rate of change tensile strength % | −2 | −5 | −34 | −45 |
| Rate of change elongation % | −7 | −13 | −15 | −30 |
| Hardness change | −2 | −4 | −5 | −10 |

*1 Halogenated butyl rubber (Japan Synthetic Rubber Co.)
*2 Chroloprene rubber (Showa Neoprene Co.)
*3 Alkylphenol formaldehyde resin (Sumitomo Chemical Co., Ltd)
*4 Bromomethylalkylphenol formaldehyde resin (Sumitomo Chemical Co., Ltd)

EXAMPLES 23-24 AND COMPARTIVE EXPERIMENTS 14-15

In a Banbury mixer, the polyorganosiloxanes consisting of the components shown in Table 7, and ethylene propylene diene rubber were uniformly blended. With a two-roll mill, the resultant mixture and a sulfur vulcanizer added thereto were blended to prepare a compound. Then, the compound was vulcanized for 20 minuts under pressure of 150 kgf/cm$^2$ at a temperature of 160° C., to afford a vulcanized sheet 2 mm in thickness. The sheet was tested for physical properties by the method of JIS K 6301. The results are show in Table 7.

For comparison, a polymethylvinylsiloxane having a vinyl group content of 0.5 mol %, and ethylene propylene diene rubber were blended and vulcanized by the same procedure. The samples obtained for Comparative Experiments 14 and 15 were tested for physical properties. The results are shown in Table 7.

It is noted from Table 7 that the polymethyl(ethylidene norbornyl)siloxane is superior to the conventional polymethylvinylsiloxane in co-vulcanizing property and, consequently, in mechanical strength.

TABLE 7

| | Examples | | Comparative Experiments | |
|---|---|---|---|---|
| Sample No. | 23 | 24 | 14 | 15 |
| Amount | | | | |
| Polymethyl(ethylidene norbornyl)siloxne (containing 0.5 mol % of ENB having a polymerization degree of about 7000) | 50 | 50 | — | — |
| Polymethylvinylsiloxane (containing 0.5 mol % of vinyl group) | — | — | 50 | 50 |
| JSR EP43 *1 | 50 | 50 | 50 | 50 |
| Silica | 50 | 25 | 50 | 25 |
| Carbon black | — | 34 | — | 34 |
| Naphthene oil | — | 17.5 | — | 17.5 |
| Zinc oxide | 5 | 5 | 5 | 5 |
| Stearic acid | 1 | 1 | 1 | 1 |
| Sanceler TS *2 | 1.5 | 1.5 | 1.5 | 1.5 |
| Mercaptobenzothiazole | 0.5 | 0.5 | 0.5 | 0.5 |
| Sulfur | 1.5 | 1.5 | 1.5 | 1.5 |
| Physical properties | | | | |
| Tensile strength kgf/cm$^2$ | 123 | 121 | 59 | 52 |
| Elongation % | 380 | 430 | 860 | 900 |
| Hardness (JIS A) | 74 | 64 | 58 | 52 |

*1 Ethylene propylene diene rubber (Japan Synthetic Rubber Co.)
*2 Tetramethylthiuram disulfide (Sanshin Kagaku Co.)

EXAMPLES 25-27 AND COMPARATIVE EXPERIMENTS 16-17

In a Banbury mixer, the polyorganosiloxanes having the components shown in Table 8, and ethylene propylene diene rubber were uniformly blended. With a two roll mill, the resultant mixture and a peroxide vulcanizer added thereto were blended to prepare a compound. Then, the compound was vulcanized for 20 minuts under pressure of 150 kgf/cm$^2$ at a temperature of 160° C., to afford a vulcanized sheet 2 mm in thickness. The sheet was tested for physical properties by the method of JIS K 6301. The results are shown in Table 8.

For comparison, a polymethylvinylsiloxane having a vinyl group content of 0.5 mol %, and ethylene propylene diene rubber were blended and vulcanized by the same procedure. The samples obtained for Comparative Experiments 16 and 17 were tested for physical properties.

It is noted from Table 8 that when the vulcanization was carried out using a resin vulcanizer, the polymethyl (ethylidene norbornyl)siloxane is superior to the conventional polymethylvinylsiloxane in co-vulcanizing property and, consequently, in mechanical strength. It is seen from example 27 that the mixture of polymethyl-(ethylidene norbornyl)siloxane and polymethylvinylsiloxane is more effective than polymethylvinylsiloxane alone.

TABLE 8

| Sample No. | Examples | | | Comparative Experiments | |
|---|---|---|---|---|---|
| | 25 | 26 | 27 | 16 | 17 |
| Amount | | | | | |
| Polymethyl(ethylidene norbornyl)siloxane (containing 0.5 mol % of ENB having a polymerization degree of about 7000) | 50 | 50 | — | — | — |
| Polymethyl(ethylidene norbornyl)siloxane (containing 8 mol % of ENB having a polymerization degree of about 5500) | — | — | 10 | — | — |
| Polymethylvinylsiloxane (containing 0.5 mol % of vinyl group) | — | — | 40 | 50 | 50 |
| Ethylene propylene dien rubber | 50 | 5 | 50 | 50 | 50 |
| Silica | 50 | 25 | 25 | 50 | 25 |
| Carbon black | — | 34 | 34 | — | 34 |
| Naphthene oil | — | 17.5 | 17.5 | — | 17.5 |
| Zinc oxide | 5 | 5 | 5 | 5 | 5 |
| Stearic acid | 1 | 1 | 1 | 1 | 1 |
| Percumyl D-40 *1 | 6.8 | 6.8 | 6.8 | 6.8 | 6.8 |
| Sulfur | 0.3 | 0.3 | 0.3 | 0.3 | 0.3 |
| Physical properties | | | | | |
| Tensile strength kgf/cm$^2$ | 142 | 140 | 120 | 102 | 100 |
| Elongation % | 360 | 410 | 450 | 340 | 380 |
| Hardness (JIS A) | 65 | 62 | 69 | 67 | 63 |

*1 Dicumyl peroxide (content 40%) (Nippon Yushi Co.)

EXAMPLES 28-31

Sheets 2 mm in thickness were prepared, by following the same procedure of Examples 23,25 except using a polymethyl(dicyclopentenyl)siloxane or a polymetyl(4-hexenyl)siloxane, in the place of the aforementioned polymethyl(ethylidene norbornyl)siloxane. The results are shown in Table 9.

TABLE 9

| Sample No. | Examples | | | |
|---|---|---|---|---|
| | 28 | 29 | 30 | 31 |
| Amount | | | | |
| Polymethyl(ethylidene norbornyl)siloxane *1 | 50 | — | 50 | — |
| Polymethyl(4-hexenyl) siloxane *2 | — | 50 | — | 50 |
| JSR EP87X *3 | 50 | 50 | 50 | 50 |
| Silica | 50 | 50 | 50 | 50 |
| Zinc oxide | 5 | 5 | 5 | 5 |
| Stearic acid | 1 | 1 | 1 | 1 |
| Tetramethyl thiuram monosulfide | 1.5 | 1.5 | — | — |
| Mercaptobenzothiazole | 0.5 | 0.5 | — | — |
| Sulfur | 1.5 | 1.5 | 0.3 | 0.3 |
| Dicumyl peroxide (content 40%) | — | — | 6.8 | 6.8 |
| Physical properties | | | | |
| Tensile strength kgf/cm$^2$ | 110 | 132 | 135 | 149 |
| Elongation % | 460 | 320 | 410 | 270 |
| Hardness (JIS A) | 65 | 69 | 68 | 72 |

*1 Dicyclopetenyl group content of organic groups 0.5 mol %
Methyl group content of organic groups 99.5 mol %
Terminal group: Trimethylsiloxy unit
*2 4-hexenyl group content of organic groups 0.5 mol %
Methyl group content of organic groups 99.5 mol %
Terminal group: Trimethylsiloxy unit
*3 Ethylene propylene diene rubber (Japan synthetic rubber Co.)

As described above, this invention produces a silicone elastomer composition which can be vulcanized with any of the conventional vulcanizers intended for organic synthetic rubber.

The molded article obtained from the silicone elastomer composition of the present invention finds extensive utility in applications to tubes, products of profile extrusion, packings, and gaskets.

We claim:

1. A silicone elastomer composition, comprising:
   (A) 100 parts by weight of polyorganosiloxane having a polymerization degree of at least 20, wherein the organic groups are selected from monovalent substituted and unsubstituted hydrocarbon groups and are attached to silicon atom at a rate, on average, in the range of 1.9 to 2.1 per silicon atom, and at least two of said organic groups are monovalent hydrocarbon groups possessing at least five carbon atoms and an aliphatic carbon-carbon double bond bonded to a silicon atom via at least one carbon atom,
   (B) 5 to 200 parts by weight of an inorganic filler having a specific surface area of at least 50 m$^2$/g, and
   (C) 0.1 to 25 parts by weight of a vulcanizer selected from the group consisting of sulfur, sulfur donors, substituted or unsubstituted alkylphenol resins, and quinoids.

2. A silicone elastomer composition according to claim 1, wherein said monovalent hydrocarbon groups of (A) possessing at least five carbon atoms and a carbon-carbon double bond bonded to a silicon atom via at least one carbon atom are present in the range of 0.05 to 5 mol % of said organic groups.

3. A silicone elastomer composition according to claim 1, wherein said monovalent hydrocarbon groups of (A) possessing at least five carbon atoms and a carbon-carbon double bond bonded to a silicon atom via at least one carbon atom are alkylidene norbornyl groups.

4. A silicone elastomer composition according to claim 1, wherein said polymerization degree of (A) is not less than 1,000.

5. A silicone elastomer composition, comprising:
(A) 100 parts by weight of a composition consisting of
  (a) a polyorganosiloxane of a polymerization degree of at least 20, wherein the organic groups are selected from monovalent substituted and unsubstituted hydrocarbon groups and are attached to silicon atom at a rate, on average, in the range of 1.9 to 2.1 per silicon atom and at least two of said organic groups are monovalent hydrocarbon groups possessing at least five carbon atoms and an aliphatic carbon-carbon double bond bonded to a silicon atom via at least one carbon atom and
  (b) an organic elastomer, at a mixing ratio, (a)/(b), in the range of 95/5 to 5/95 (by weight) and
(B) 0.1 to 25 parts by weight of vulcanizer selected from the group consisting of sulfur, sulfur donors, substituted or unsubstituted alkylphenol resins, and quinoids.

6. A silicone elastomer composition according to claim 5, wherein said monovalent hydrocarbon groups of (A) possessing at least five carbon atoms and a carbon carbon double bond bonded to a silicon atom via at least one carbon atom are present in the range of 0.05 to 5 mol % of said organic groups.

7. A silicone elastomer composition according to claim 5, wherein said monovalent hydrocarbon groups of (A) possessing at least five carbon atoms and a carbon carbon double bond bonded to a silicon atom via at least one carbon atom are alkylidene norbornyl groups.

8. A silicone elastomer composition according to claim 5, wherein said polymerization degree of (A) is not less than 1,000.

9. A silicone elastomer composition, comprising:
(A) 100 parts by weight of a composition consisting of
  (a) a polyorganosiloxane mixture formed of
    (a-1) not less than 5 parts by weight of a polyorganosiloxane of a polymerization degree of at least 20, wherein the organic groups are selected from monovalent substituted and unsubstituted hydrocarbon groups and are attached to silicon atom at a rate, on average, in the range of 1.9 to 2.1 per silicon atom and at least two of said organic groups are monovalent hydrocarbon groups possessing at least five carbon atoms and a carbon-carbon double bond bonded to a silicon atom via at least one carbon atom and
    (a-2) not more than 95 parts by weight of a polyorganosiloxane of a polymerization degree of at least 20, wherein the organic crosslinking groups are selected from monovalent substituted and unsubstituted hydrocarbon groups and are attached to silicon atom at a rate, on average, in the range of 1.9 to 2.1 per silicon atom and substantially no monovalent hydrocarbon groups contained which possesses at least five carbon atoms and a carbon carbon double bond bonded to a silicon atom via at least one carbon atom and
  (b) an organic elastomer, at a mixing ratio, (a)/(b), in the range of 95/5 to 5/95 (by weight) and
(B) 0.1 to 25 parts by weight of a vulcanizer selected from the group consisting of sulfur, sulfur donors, substituted or unsubstituted alkylphenol resins, and quinoids.

10. A silicone elastomer composition according to claim 9, wherein said monovalent hydrocarbon groups of (A) possessing at least five carbon atoms and a carbon-carbon double bond bonded to a silicon atom via at least one carbon atom are present in the range of 0.05 to 5 mol % of said organic groups.

11. A silicone elastomer composition according to claim 9, wherein said monovalent hydrocarbon groups of (A) possessing at least five carbon atoms and a carbon-carbon double bond bonded to a silicon atom via at least one carbon atom are alkylidene norbornyl groups.

12. A silicone elastomer composition according to claim 9, wherein said polymerization degree of (A) is not less than 1,000.

13. A silicone elastomer composition according to claim 5, wherein said composition also includes 5 to 200 parts by weight of an inorganic filler.

* * * * *